(No Model.)
J. W. FUNK.
BELT TIGHTENER.
No. 375,673. Patented Dec. 27, 1887.
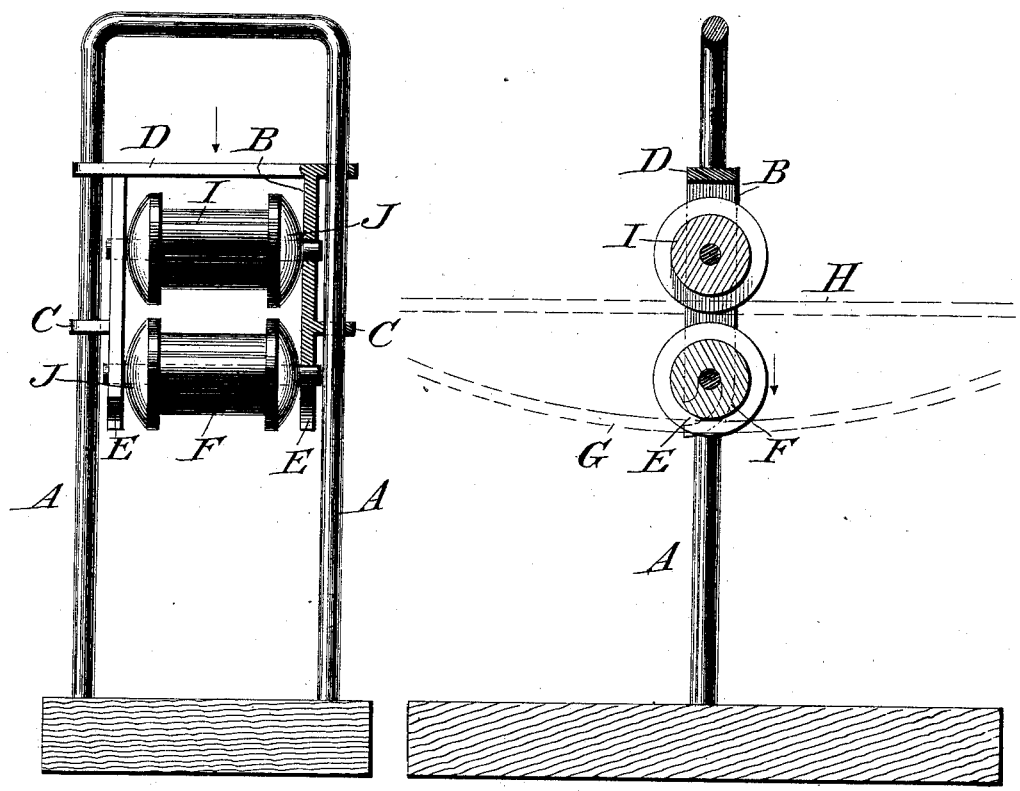
Fig. 1. Fig. 2.
Fig. 3.
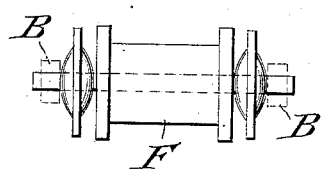
Witnesses
F. H. Schott
Newton Cranford
Inventor
John W. Funk
By his Attorneys
Shude & Ruff

UNITED STATES PATENT OFFICE.

JOHN W. FUNK, OF HEYWORTH, ILLINOIS.

BELT-TIGHTENER.

SPECIFICATION forming part of Letters Patent No. 375,673, dated December 27, 1887.

Application filed May 24, 1887. Serial No. 239,241. (No model.)

*To all whom it may concern:*

Be it known that I, JOHN W. FUNK, of Heyworth, in the county of McLean, and in the State of Illinois, have invented certain new and useful Improvements in Belt-Tighteners; and I do hereby declare that the following is a full, clear, and exact description thereof, reference being had to the accompanying drawings, and to the letters of reference marked thereon, making a part of this specification.

My invention relates to an improvement in belt-tighteners, the object of the same being to provide a device of this character by means of which the slack in an endless belt may be automatically taken up.

A further object is to provide a device of the above character which shall be simple and economical in construction and durable and efficient in use; and with these ends in view my invention consists in the certain features of construction and combinations of parts, as will be hereinafter fully described, and pointed out in the claim.

In the accompanying drawings, Figure 1 is a front view of my invention. Fig. 2 is a side view thereof in section, and Fig. 3 is a modification.

A represents the standards, secured to a suitable platform in any desired manner, on which is adapted to slide the frame B, the latter being provided with the loops C and the cross-piece D, having suitable perforations adapted to engage said standards. The lower ends of the sliding frame B are provided with the curved open slots E, in which is journaled the pulley F, the belt G passing beneath the same. The portion H of said belt passes either between the pulley F and the pulley I, journaled above the pulley F, or it may be passed over the top of said pulley I, if preferred.

The object of the open slots E is to enable the pulley F to be readily removed when worn, and in place of which a new one may be substituted without much delay, and, further, for the purpose of enabling the belt to be removed by releasing the pulley from the open slot. The pulleys are provided with the oval edges J, for the purpose of lessening the friction at the contact-points. If preferred, however, the frame may be provided with conical projections at the points where the pulleys are journaled, and the same result will be accomplished.

It will be understood that when the device is attached to a machine in the first instance the belt will be perfectly taut, with the pulley F resting thereon. Through the force of wear, or of the elements, if exposed, the belt is liable to stretch and become slack, in consequence of which its usefulness would be greatly impaired if not provided against.

By the use of this device the weight of the sliding frame will automatically serve to keep the belt constantly taut.

Having fully described my invention, what I claim as new, and desire to secure by Letters Patent, is—

In a belt-tightener, the combination, with the rods A, of a frame having loops C, engaging said rods, and curved open slots E in the ends of said frame, and a removable pulley, F, mounted in the slots E, substantially as shown and described.

In testimony that I claim the foregoing I have hereunto set my hand this 19th day of May, 1887.

JOHN W. FUNK.

Witnesses:
 THOS. SLADE,
 JOHN W. FUNK, Jr.,
 C. MOULTON.